US012578818B2

(12) United States Patent　　(10) Patent No.:　US 12,578,818 B2

Matsuda　　(45) Date of Patent:　Mar. 17, 2026

(54) INPUT DEVICE FOR DETECTING APPROACH, CONTACT, AND PRESSING

(71) Applicant: Alps Alpine Co., Ltd., Tokyo (JP)

(72) Inventor: Atsushi Matsuda, Tokyo (JP)

(73) Assignee: Alps Alpine Co., Ltd, Tokyo (JP)

( * ) Notice: Subject to any disclaimer, the term of this patent is extended or adjusted under 35 U.S.C. 154(b) by 0 days.

(21) Appl. No.: 18/813,667

(22) Filed: Aug. 23, 2024

(65) Prior Publication Data

US 2024/0411403 A1　Dec. 12, 2024

Related U.S. Application Data

(63) Continuation of application No. PCT/JP2022/046576, filed on Dec. 19, 2022.

(30) Foreign Application Priority Data

Mar. 10, 2022　(JP) ................................. 2022-037453

(51) Int. Cl.
G06F 3/041　(2006.01)
G06F 3/044　(2006.01)

(52) U.S. Cl.
CPC ........ G06F 3/041662 (2019.05); G06F 3/044 (2013.01)

(58) Field of Classification Search
CPC .... G06F 3/041; G06F 3/041662; G06F 3/044; G06F 3/0445–0446; G06F 2203/04107
See application file for complete search history.

(56) References Cited

U.S. PATENT DOCUMENTS

| | | | | |
|---|---|---|---|---|
| 2011/0227866 | A1* | 9/2011 | Kawaguchi | ............. G06F 3/041 |
| | | | | 345/174 |
| 2015/0090579 | A1 | 4/2015 | Kurikawa et al. | |
| 2016/0357287 | A1 | 12/2016 | Bannai et al. | |
| 2018/0157353 | A1* | 6/2018 | Sleeman | ............. H03K 17/975 |
| 2019/0204952 | A1* | 7/2019 | Han | ...................... G06F 3/0416 |
| 2021/0146800 | A1* | 5/2021 | Salter | .................... B60N 2/206 |
| 2021/0247873 | A1 | 8/2021 | Miyahara et al. | |

FOREIGN PATENT DOCUMENTS

| | | |
|---|---|---|
| JP | 2017-004136 | 1/2017 |
| JP | 2021-125158 | 8/2021 |
| WO | 2013/187397 | 12/2013 |

OTHER PUBLICATIONS

International Search Report from International Application No. PCT/JP2022/046576 dated Mar. 7, 2023, with machine translation.

* cited by examiner

*Primary Examiner* — Liliana Cerullo

(74) *Attorney, Agent, or Firm* — Beyer Law Group LLP

(57) ABSTRACT

An input device with a simple configuration capable of detecting approach and contact of a detection target and pressing by the detection target is provided. The input device includes a first electrode, an elastic dielectric provided on a back side of the first electrode, a second electrode provided with the elastic dielectric sandwiched between the second electrode and the first electrode, a detector that detects approach and contact of a detection target to and with the first electrode and pressing of the first electrode by the detection target on a basis of an output of the first electrode, and a third electrode provided adjacent to the second electrode.

12 Claims, 15 Drawing Sheets

Comparative Example

FIG. 3

Comparative Example

Comparative Example

Comparative Example

FIG. 5B
Comparative Example

Comparative Example

INPUT DEVICE FOR DETECTING APPROACH, CONTACT, AND PRESSING

CLAIM OF PRIORITY

This application is a Continuation of International Application No. PCT/JP2022/046576 filed on Dec. 19, 2022, which claims benefit of Japanese Patent Application No. 2022-037453 filed on Mar. 10, 2022. The entire contents of each application noted above are hereby incorporated by reference.

BACKGROUND OF THE INVENTION

1. Field of the Invention

The present disclosure relates to an input device.

2. Description of the Related Art

There is a conventional touch panel including a touch sensor substrate that is rectangular in plan view and on which a sensor electrode that detects a touch position of a pointing object is formed, a cover panel that is fixed on one surface of the touch sensor substrate and that is pressed by the pointing object, a first electrode formed outside a display area of a surface of the cover panel opposite a surface pressed by the pointing object, and a second electrode formed outside a display area of the one surface of the touch sensor substrate.

The first electrode and the second electrode at least partially overlap in plan view. The second electrode is formed in at least one corner of the touch sensor substrate and electrically isolated from the sensor electrode. The second electrode detects a level of pressure with which the pointing object presses the touch sensor substrate through the cover panel by measuring, as a change in capacitance between the first electrode and the second electrode, a change in a distance between the first electrode and the second electrode at a time when the surface of the cover panel pressed by the pointing object is pressed. A ground electrode formed in a periphery of the first electrode of the cover panel is further included (e.g., refer to Japanese Unexamined Patent Application Publication No. 2021-125158).

SUMMARY OF THE INVENTION

Since the sensor electrode for detecting the touch position and the first and second electrodes for detecting pressing are separately provided in the conventional touch panel, the number of parts is large, and configuration is not simple.

The present invention provides an input device with a simple configuration capable of detecting approach and contact of a detection target and pressing by the detection target.

An input device according to an embodiment of the present disclosure includes a first electrode, an elastic dielectric provided on a back side of the first electrode, a second electrode provided with the elastic dielectric sandwiched between the second electrode and the first electrode, a detector that detects approach and contact of a detection target to and with an operation surface located on a front side of the first electrode and pressing of the operation surface by the detection target on a basis of an output of the first electrode, and a third electrode provided adjacent to the second electrode.

An input device with a simple configuration capable of detecting approach and contact of a detection target and pressing by the detection target can be provided.

BRIEF DESCRIPTION OF THE DRAWINGS

FIG. 3 is a diagram illustrating a voltage applied to each of electrodes;

FIG. 5B is a diagram illustrating other characteristics of the capacitance of the comparative input device 10;

DESCRIPTION OF THE PREFERRED EMBODIMENTS

An embodiment where an input device in the present disclosure is employed will be described hereinafter.

EMBODIMENT

Figure 1:
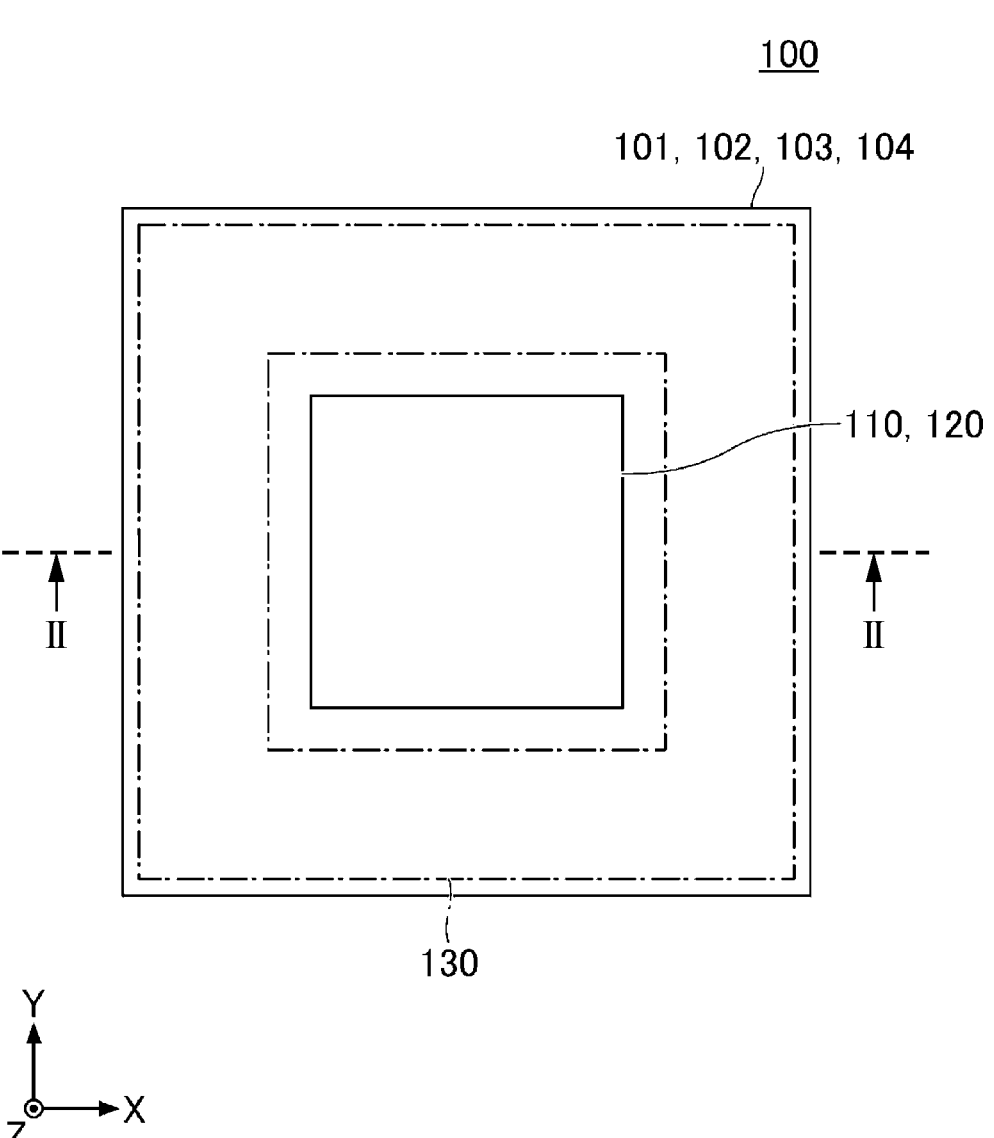
FIG. 1 is a diagram illustrating planar configuration of an input device 100 according to an embodiment.
Figure 2:
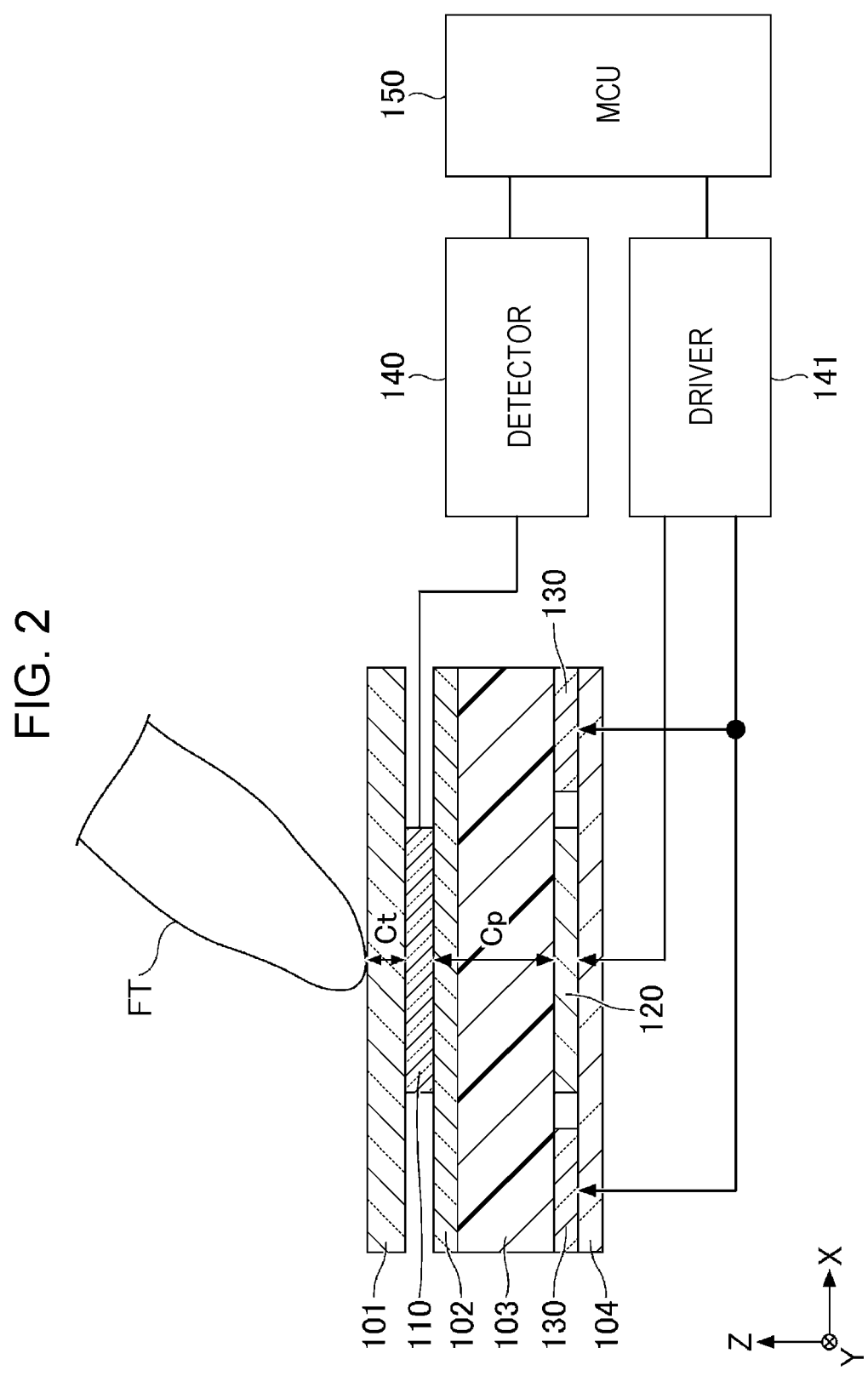
FIG. 2 is a diagram illustrating a cross-section taken along an arrow II-II in FIG. 1.

FIG. 1 is a diagram illustrating planar configuration of an input device 100 according to the embodiment. FIG. 2 is a diagram illustrating a cross-section taken along an arrow II-II in FIG. 1. An XYZ coordinate system will be defined in the following description. A direction parallel to an X-axis (X direction), a direction parallel to a Y-axis (Y direction), and a direction parallel to a Z-axis (Z direction) are perpendicular to one another. Although a −Z direction will be referred to as downward or below and a +Z direction will be referred to as upward or above for convenience of description, these terms do not indicate a universal vertical relationship. A plan view refers to a view in XY plane. Length, thickness, and the like of each of components might be exaggerated in order to make configurations easy to understand.

Configuration of Input Device 100

The input device 100 includes a top panel 101, a substrate 102, an elastic dielectric 103, a substrate 104, a first electrode 110, a second electrode 120, a third electrode 130, a detector 140, a driver 141, and an MCU (micro controller unit) 150. FIG. 2 illustrates the detector 140 and the MCU 150 along with a user's fingertip FT.

The user inputs an operation to the input device 100 by touching (contacting) an operation surface (upper surface) of the top panel 101 with his/her fingertip FT. The fingertip FT is an example of a detection target. The input device 100 can be operated with a medium other than the fingertip FT, but it is assumed in the following description that the input device 100 is operated with the fingertip FT.

The input device 100 detects approach and contact of the user's fingertip FT to and with the operation surface of the top panel 101 and pressing of the operation surface by the user's fingertip FT and outputs data indicating details of an input operation to an apparatus to be operated connected to the input device 100. The input device 100 may be used to remotely operate the apparatus to be operated or may be integrated with the apparatus to be operated. The input device 100 may be portable or may be fixable to a wall surface or the like, instead.

In an example, the top panel 101 is composed of transparent glass or a resin, can warp when pressed from the upper surface, and is a rectangular plate-like member in plan view, and the upper surface thereof is an operation surface with which the user inputs an operation with his/her fingertip FT through contact. The user can press the upper surface of the top panel 101 downward.

The first electrode 110 is provided on an upper surface of the substrate 102, which is provided below a lower surface of the top panel 101. An upper surface side (upward) of the first electrode 110 is a front side facing the top panel 101, and a lower surface side (downward) of the first electrode 110 is a back side opposite the front side. The operation surface, which is the upper surface of the top panel 101, therefore, is located on the front side of the first electrode 110. The first electrode 110 is, for example, a transparent electrode such as ITO (indium tin oxide).

In an example, the first electrode 110 is rectangular in plan view, and a mode where the first electrode 110 is square will be described hereinafter. Area of the first electrode 110 is the same as that of the second electrode 120, and the first electrode 110 is provided such that the entirety of an outer edge of the first electrode 110 matches that of the second electrode 120 in plan view.

The first electrode 110 is connected to the detector 140 through a wire. The first electrode 110 is provided in order to detect approach or contact of the fingertip FT on the basis of an absolute self-capacitance of the first electrode 110. The absolute self-capacitance of the first electrode 110 is a capacitance Ct between the first electrode 110 and the fingertip FT illustrated in FIG. 2. The first electrode 110 is provided in order to detect pressing by the fingertip FT on the basis of a mutual capacitance relative to the second electrode 120. The mutual capacitance is a capacitance Cp between the first electrode 110 and the second electrode 120 illustrated in FIG. 2.

The substrate 102 is a transparent substrate holding the first electrode 110 and, as with the top panel 101, only needs to be able to warp when pressed from an upper surface thereof. In an example, the substrate 102 may be a transparent polyimide substrate.

The elastic dielectric 103 is provided under (behind) the substrate 102. Since the substrate 102 is provided under (behind) the first electrode 110, the elastic dielectric 103 is provided below (behind) the first electrode 110 with the substrate 102 sandwiched between the elastic dielectric 103 and the first electrode 110. Here, the first electrode 110 may be directly provided on an upper surface of the elastic dielectric 103 without providing the substrate 102 on the elastic dielectric 103. That is, the provision of the elastic dielectric 103 under (behind) the first electrode 110 refers to both a case where the elastic dielectric 103 is provided indirectly below (behind) the first electrode 110 with the substrate 102 sandwiched between the elastic dielectric 103 and the first electrode 110 and a case where the elastic dielectric 103 is provided directly under (behind) the first electrode 110 without the substrate 102 being sandwiched between the elastic dielectric 103 and the first electrode 110. This also includes a case where an insulating layer or the like is provided between the first electrode 110 and the elastic dielectric 103 instead of the substrate 102 and a case where a structure such as an insulating layer is provided in addition to the substrate 102.

The elastic dielectric 103 is a transparent, elastically deformable dielectric and, for example, composed of a urethane resin. The elastic dielectric 103 is provided at a position overlapping the top panel 101, the first electrode 110, and the substrate 102 in plan view, and thickness thereof in the Z direction is uniform. Since the elastic dielectric 103 is elastically deformable, the elastic dielectric 103 warps and contracts and the first electrode 110 and the substrate 102 are displaced slightly downward when the user presses a portion of the operation surface of the top panel 101 directly above a detection electrode 111 downward with the fingertip FT.

The second electrode 120 is provided on an upper surface of the substrate 104, which is provided below the elastic dielectric 103. That is, the second electrode 120 is provided with the substrate 102 and the elastic dielectric 103 sandwiched between the second electrode 120 and the first electrode 110. In an example, the second electrode 120 is rectangular in plan view. A mode where the second electrode 120 is square in plan view will be described hereinafter. Since the first electrode 110 may be provide directly on the upper surface of the elastic dielectric 103 without providing the substrate 102 on the elastic dielectric 103 as described above, the second electrode 120 only needs to be provided with the elastic dielectric 103 sandwiched between the second electrode 120 and the first electrode 110.

The second electrode 120 and the first electrode 110 have similar electrode shapes, and central positions thereof match in plan view. Area of the second electrode 120 is the same as that of the first electrode 110. The second electrode 120, therefore, is provided such that the outer edge of the second electrode 120 matches that of the first electrode 110.

The second electrode 120 is provided in order to detect downward pressing of the top panel 101 by the fingertip FT on the basis of the mutual capacitance relative to the first electrode 110. In an example, the second electrode 120 is composed of a transparent conductive material such as an ITO film.

The third electrode 130 is provided on the upper surface of the substrate 104 in such a way as to surround the second electrode 120 in plan view. In other words, the third electrode 130 is provided adjacent to the second electrode 120. The third electrode 130 has a rectangular ring shape in plan view. The third electrode 130 is provided such that a central position thereof matches those of the second electrode 120 and the first electrode 110 in plan view.

The third electrode 130 is provided in order to block floating capacitance from a ground (a structure having a ground potential) around the input device 100 when approach and contact of the fingertip FT to and with the operation surface of the top panel 101 are detected, and stabilize the mutual capacitance between the first electrode 110 and the second electrode 120 when pressing by the fingertip FT is detected. In an example, the third electrode 130 is composed of a transparent conductive material such as an ITO film. The third electrode 130 is provided in order to reduce movement of an electric field from the second electrode 120 to the fingertip FT by pulling the electric field from the second electrode 120 to the third electrode 130, details of which will be described later. The provision of the third electrode 130 adjacent to the second electrode 120, therefore, refers to a situation where the third electrode 130 is provided adjacent to the second electrode 120 closely enough to the second electrode 120 to be able to reduce the movement of an electric field from the second electrode 120 to the fingertip FT by deflecting the electric field toward the third electrode 130.

Although a mode where the third electrode 130 has a rectangular ring shape in plan view and surrounds the second electrode 120 in plan view will be described hereinafter, the third electrode 130 is not limited to a rectangular ring shape, and need not have a ring shape. When the second electrode 120 is rectangular, for example, the third electrode 130 may be four electrodes or the like provided along four sides of the second electrode 120, instead. The third electrode 130 does not completely surrounds the second electrode 120 in plan view in this case, but is provided adjacent to the second electrode 120.

The substrate 104 is a transparent substrate holding the second electrode 120 and the third electrode 130. In an example, the substrate 104 may be a transparent polyimide substrate as with the substrate 102, but may be a transparent glass or resin substrate, instead, that hardly warps even when the operation surface of the top panel 101 is pressed.

A mode where the top panel 101, the first electrode 110, the substrate 102, the elastic dielectric 103, the second electrode 120, the third electrode 130, and the substrate 104 are transparent will be described hereinafter while assuming that a liquid crystal or organic EL (electroluminescence) display panel is provided below the input device 100. When a display panel is not provided, however, these components need not be transparent. In this case, the top panel 101, the first electrode 110, the second electrode 120, and the third electrode 130 may be composed of an opaque, conductive material such as metal plates.

The detector 140 is connected to the first electrode 110 and the MCU 150. The driver 141 is connected to the second electrode 120, the third electrode 130, and the MCU 150. The detector 140 detects approach and contact of the user's fingertip FT to and with the operation surface of the top panel 101 and pressing of the top panel 101 by the user's fingertip FT on the basis of an output of the first electrode 110. At this time, the driver 141 applies driving voltages to the second electrode 120 and the third electrode 130. More specifically, the detector 140 detects approach or contact of the fingertip FT to or with the operation surface on the basis of the absolute self-capacitance of the first electrode 110 and detects pressing of the operation surface by the fingertip FT on the basis of the mutual capacitance between the first electrode 110 and the second electrode 120. In an example, the detector 140 can be achieved by an IC (integrated circuit).

The detector 140 converts the absolute self-capacitance (analogue value) of the first electrode 110 and the mutual capacitance (analog value) between the first electrode 110 and the second electrode 120 into digital values and outputs detection data indicating the digital capacitances to the MCU 150. The application of the voltage to the first electrode 110 by the detector 140 and the driving of the second electrode 120 and the third electrode 130 by the driver 141 using the voltages are performed in a time-sharing manner. Details of this will be described later.

The MCU 150 determines details of an input operation on the basis of detection data input from the detector 140 and outputs data indicating the determined details of the input operation to an apparatus to be operated connected to the input device 100. The MCU 150 determines presence or absence of approach or contact of the fingertip FT to or with the operation surface on the basis of detection data indicating the absolute self-capacitance of the first electrode 110 input from the detector 140 and determines presence or absence of pressing of the operation surface by the fingertip FT on the basis of detection data indicating the mutual capacitance between the first electrode 110 and the second electrode 120 input from the detector 140.

When the detector 140 detects the absolute self-capacitance of the first electrode 110 and the mutual capacitance between the first electrode 110 and the second electrode 120, the MCU 150 controls the voltages applied by the detector 140 and the driver 141 to the first electrode 110, the second electrode 120, and the third electrode 130 in a time-sharing manner.

<Voltage Applied to Each Electrode>

Figure 3:
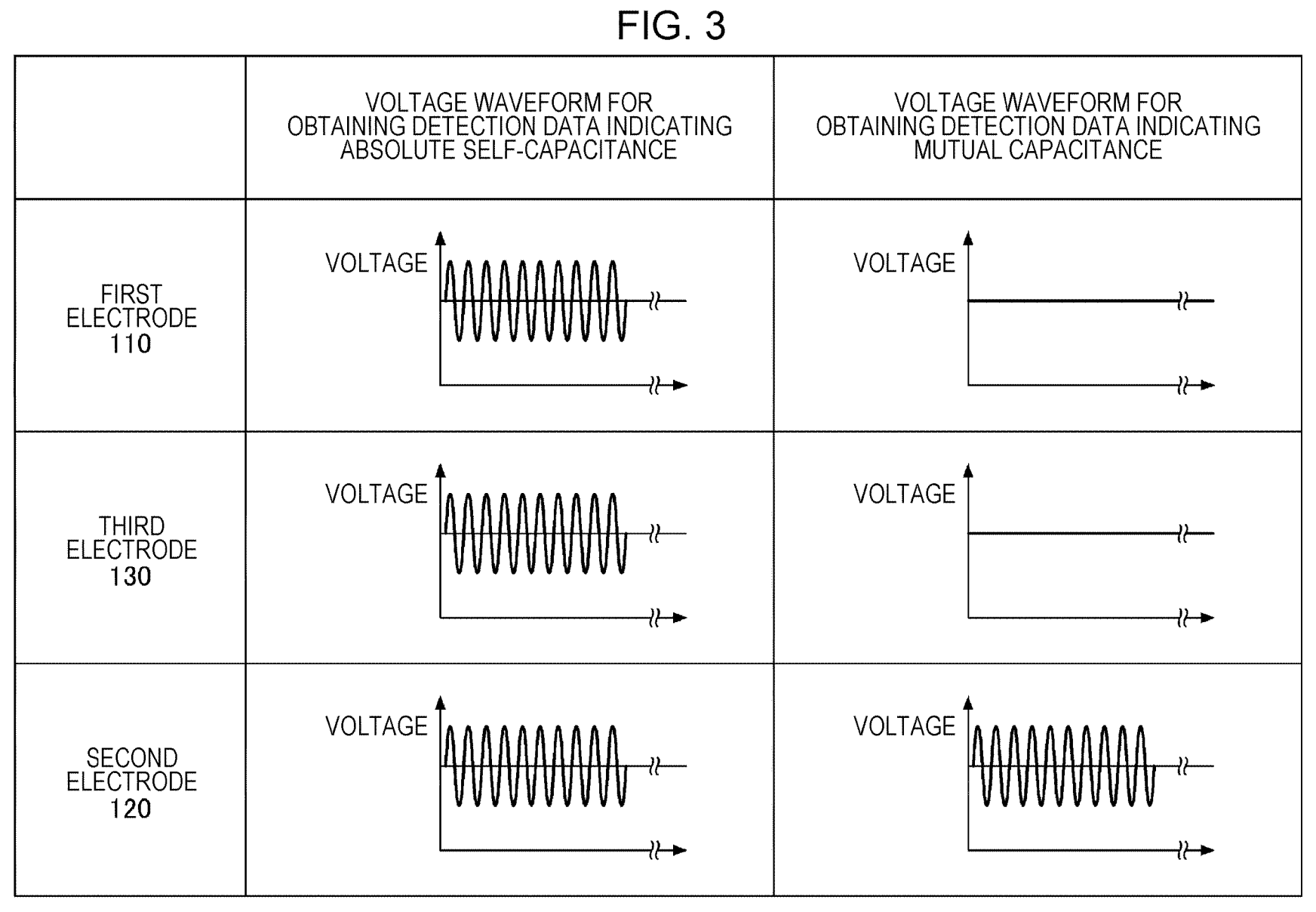

FIG. 3 is a diagram illustrating a voltage applied to each electrode. FIG. 3 illustrates voltages applied to the first electrode 110, the second electrode 120, and the third electrode 130 when the detection data indicating the absolute self-capacitance of the first electrode 110 is obtained and when the detection data indicating the mutual capacitance between the first electrode 110 and the second electrode 120 is obtained. The voltages illustrated in FIG. 3 are applied to the first electrode 110, the second electrode 120, and the third electrode 130 when the MCU 150 controls the detector 140 and the driver 141. The detector 140 applies a voltage to the first electrode 110, and the driver 141 applies voltages to the second electrode 120 and the third electrode 130.

When the detection data indicating the absolute self-capacitance of the first electrode 110 is obtained, sine-wave voltages (alternating current voltage) having the same frequency, amplitude, and phase are applied to the first electrode 110, the second electrode 120, and the third electrode 130.

The first electrode 110 can detect the self-capacitance alone, but when only the first electrode 110 is used, the first electrode 110 undesirably detects floating capacitance of a ground outside the input device 100, which increases the capacitance. As a result, it becomes difficult to increase detection sensitivity. In order to detect the absolute self-capacitance of the first electrode 110, therefore, the input device 100 blocks floating capacitance from an external ground with the second electrode 120 and the third electrode 130 by also applying alternating current voltages having the same waveform to the second electrode 120 and the third electrode 130.

Since there is no potential difference between the first electrode 110 and both the second electrode 120 and the third electrode 130, the first electrode 110 is hardly affected by capacitance of a ground, and the input device 100 can improve the detection sensitivity of the absolute self-capacitance of the first electrode 110. In doing so, even an approach state where the fingertip FT is not in contact with the operation surface but is extremely close to the operation surface can be detected. When the absolute self-capacitance is detected, the second electrode 120 and the third electrode 130 are thus used as active shields.

When the detection data indicating the mutual capacitance between the first electrode 110 and the second electrode 120 is obtained, the input device 100 applies an alternating current voltage (certain alternating current voltage) to the second electrode 120 and maintains the first electrode 110 and the third electrode 130 at a certain potential. In an example, the alternating current voltage applied to the second electrode 120 is the same as those applied to the first electrode 110, the second electrode 120, and the third electrode 130 in order to obtain the detection data indicating the absolute self-capacitance.

Since movement of electric charges (current) is detected while applying an alternating current voltage to the second electrode 120 and maintaining the first electrode 110 at the certain voltage, the second electrode 120 becomes a transmission side (Tx), and the first electrode 110 becomes a reception side (Rx).

When the first electrode 110 and the third electrode 130 are fixed at the certain potential and an alternating current voltage is applied to the second electrode 120, a potential difference is caused between the first electrode 110 and the second electrode 120, and the input device 100 can measure movement of electric charges (current) based on the mutual capacitance between the first electrode 110 and the second electrode 120. Because potentials of the first electrode 110 and the third electrode 130 only need to be constant, any direct current voltage may be applied, instead.

<Result of Simulation of Comparative Input Device 10>

Figure 4A:
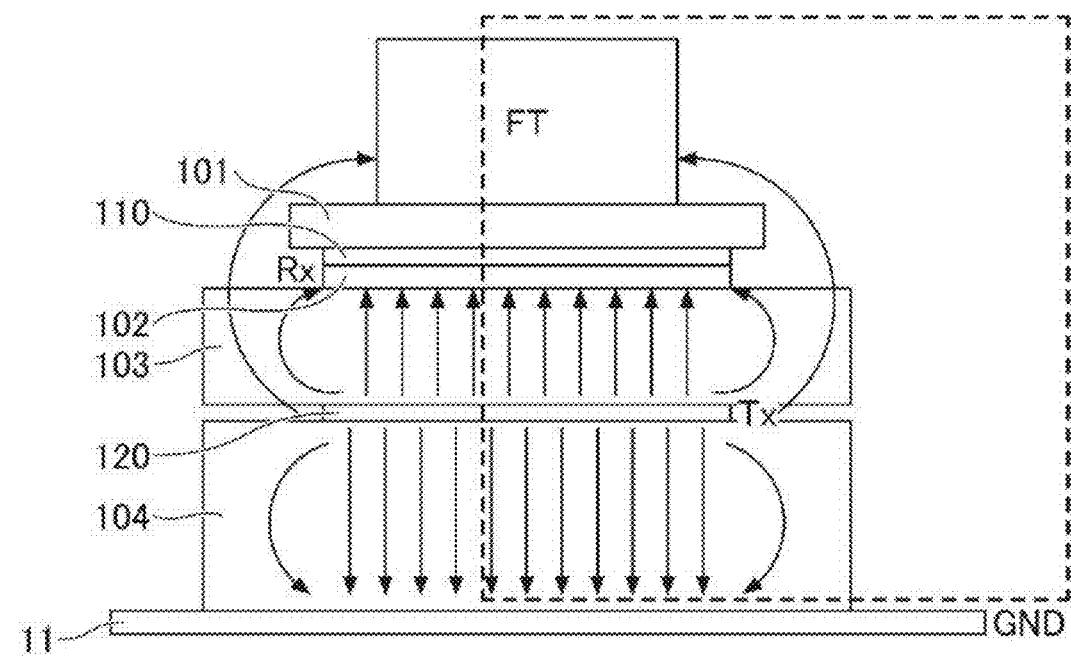
FIG. 4A is a diagram illustrating a cross-sectional configuration of a simulation model of a comparative input device 10.
Figure 4A:
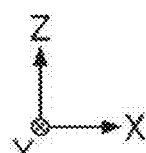
Figure 4B:
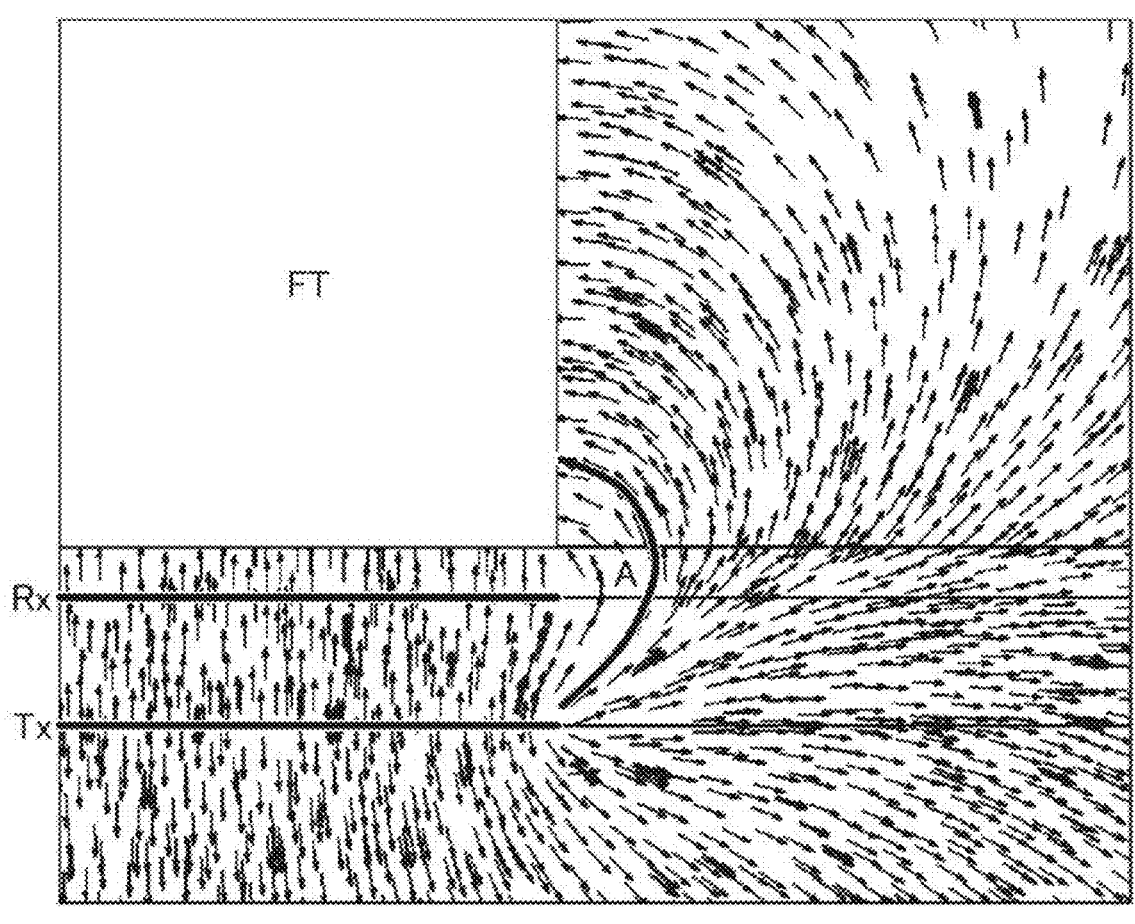
FIG. 4B is a diagram illustrating a result of simulation of electric field distribution of the comparative input device 10.
Figure 4B:
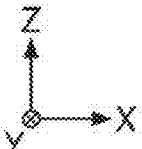
Figure 5A:
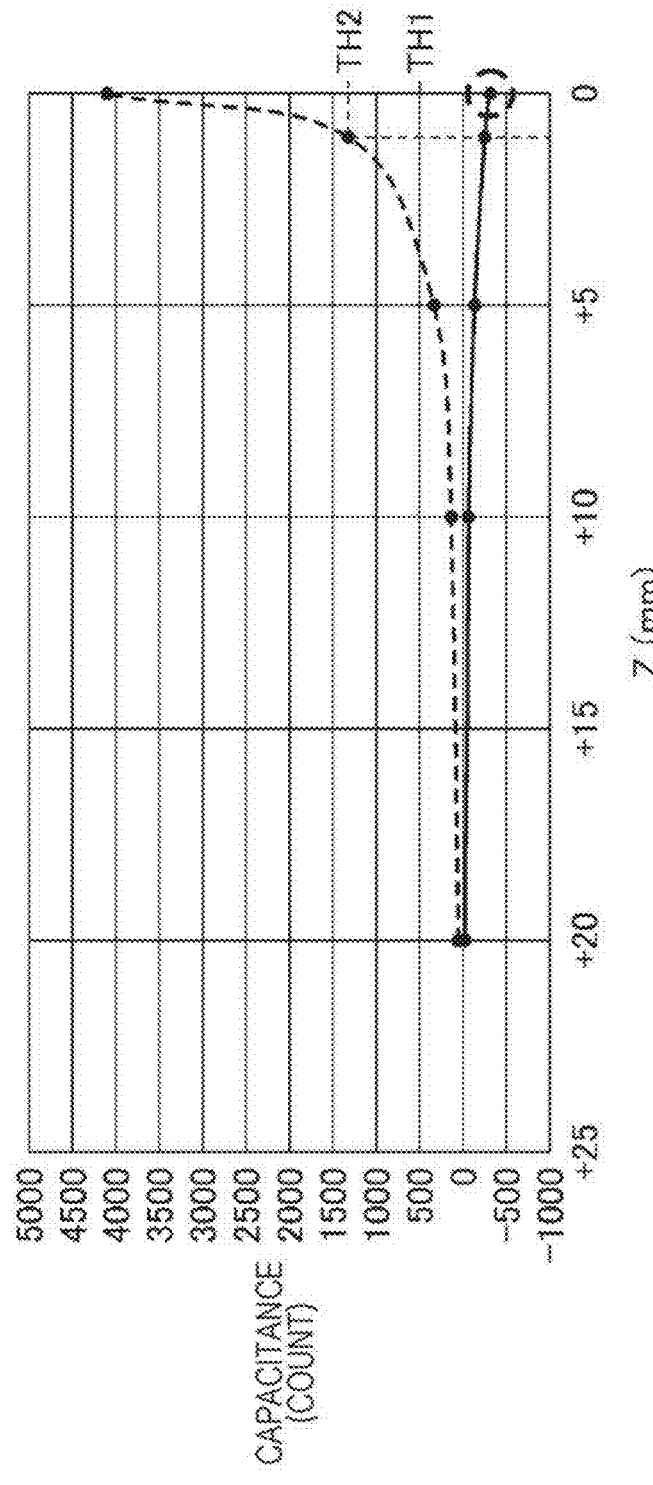
FIG. 5A is a diagram illustrating characteristics of capacitance of the comparative input device 10.
Figure 5B:
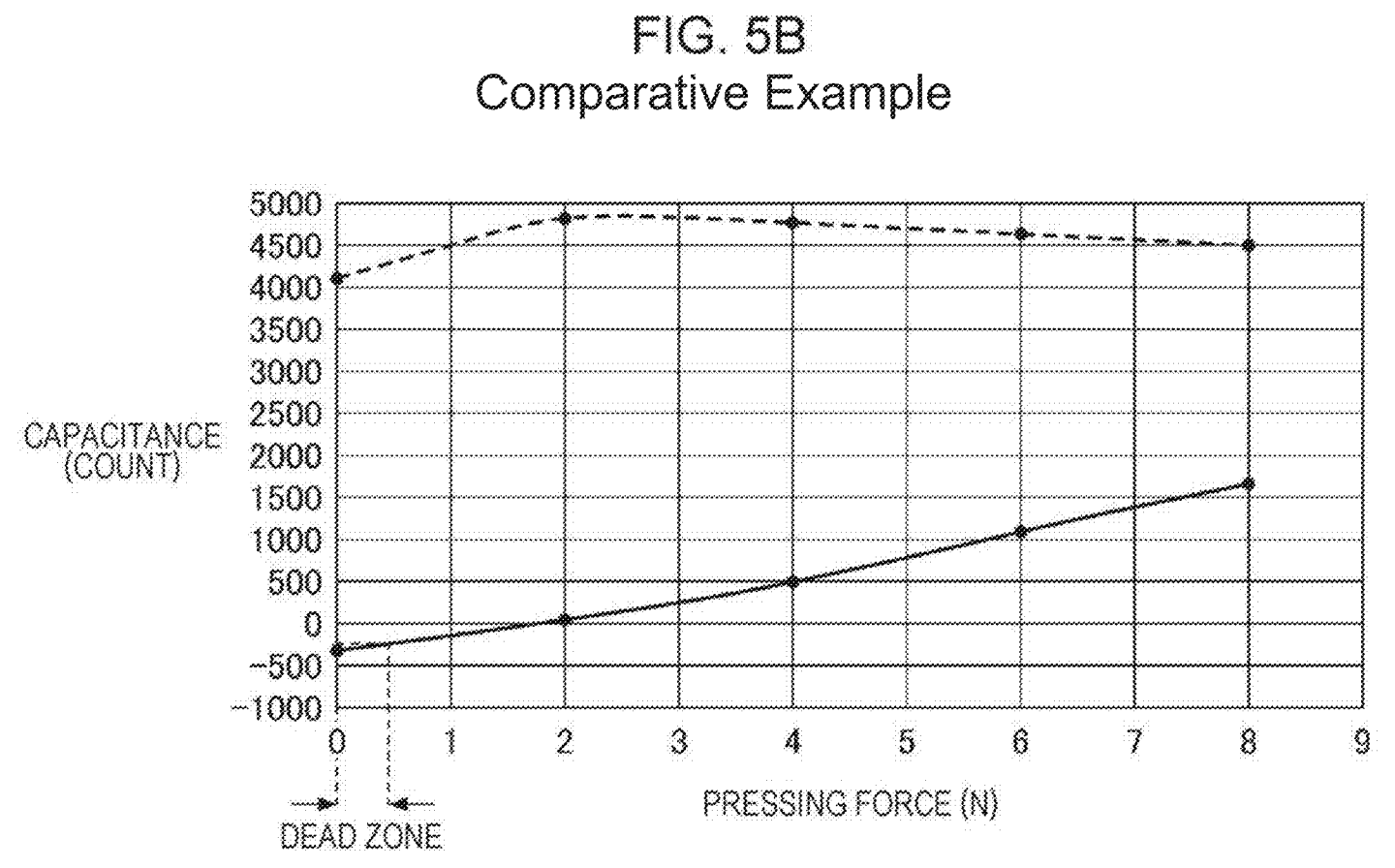
Figure 5C:
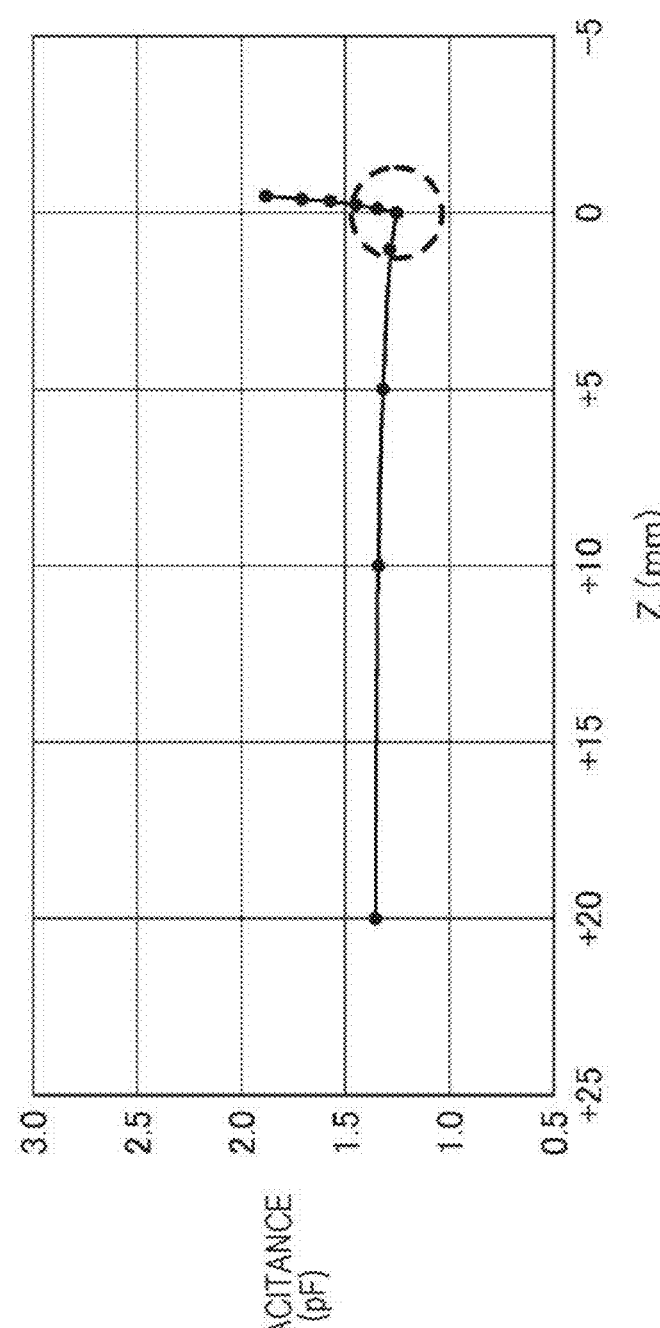
FIG. 5C is a diagram illustrating another characteristic of the capacitance of the comparative input device 10.

FIG. 4A is a diagram illustrating a cross-sectional configuration of a simulation model of a comparative input device 10. FIG. 4B is a diagram illustrating a result of a simulation of electric field distribution of the comparative input device 10. FIGS. 5A, 5B, and 5C are diagrams illustrating characteristics of capacitance of the comparative input device 10. Here, the result of the simulation of the comparative input device 10 and problems will be described before describing a result of simulation of the input device 100 according to the embodiment.

With respect to a position of the fingertip FT in the Z direction, Z=0 mm is a position of the fingertip FT in contact with the operation surface. A positive value of Z indicates that the fingertip FT is above the operation surface, and a negative value of Z indicates that the fingertip FT is pressing the operation surface downward.

As illustrated in FIG. 4A, the comparative input device 10 has a configuration obtained by removing the third electrode 130 from the input device 100 according to the embodiment. FIG. 4A illustrates a ground plate 11 under the substrate 104. The ground plate 11 is, for example, a ground layer or the like on which the comparative input device 10 is mounted, such as a circuit board.

Here, because electric field distribution is calculated with an alternating current voltage applied to the second electrode 120 and the first electrode 110 being maintained at the ground potential, a Tx (transmission side) sign is given to the second electrode 120, and an Rx (reception side) sign is given to the first electrode 110. Such application of voltages corresponds to the application of voltages for obtaining the detection data indicating the mutual capacitance between the first electrode 110 and the second electrode 120 in the input device 100 according to the embodiment.

FIG. 4B illustrates, with arrows, electric field distribution in a part defined in FIG. 4A by a broken-line rectangle. It can be seen that an electric field is strong from the second electrode 120 (Tx) toward the fingertip FT via the first electrode 110 (Rx) along a long arrow A from Tx toward the fingertip FT, that is, movement of the electric field toward the fingertip FT is significant. FIG. 4A illustrates the same arrow A as that in FIG. 4B. This is because a potential of a fingertip FT is the ground potential and the electric field has moved from the second electrode 120 (Tx) to the fingertip FT.

FIG. 5A illustrates a result of simulation of changes in capacitance in relation to the position of the fingertip FT in the Z direction at a time when the position of the fingertip FT is Z ≥0. A broken-line characteristic is a characteristic of the detection data indicating the absolute self-capacitance of the first electrode 110, and a solid-line characteristic is a characteristic of the detection data indicating the mutual capacitance between the first electrode 110 and the second electrode 120.

FIG. 5B illustrates a result of simulation of changes in capacitance in relation to pressing force (N) on the operation surface at a time when the position of the fingertip FT is Z<0. A broken-line characteristic is a characteristic of the detection data indicating the absolute self-capacitance of the first electrode 110, and a solid-line characteristic is a characteristic of the detection data indicating the mutual capacitance between the first electrode 110 and the second electrode 120. A position of pressing force being 0 (N) in FIG. 5B corresponds to a position of Z=0 mm in FIG. 5A.

FIG. 5C illustrates a result of simulation of changes in capacitance (the mutual capacitance between the first electrode 110 and the second electrode 120) in relation to the position of the fingertip FT in the Z direction. In FIG. 5C, the position of the fingertip FT in the Z direction ranges from a positive value (Z=+20 mm) to a negative value (Z=about −1 mm). A characteristic in a section of Z≥0 in FIG. 5C is the same as the solid-line characteristic in FIG. 5A. A characteristic in a section of Z<0 in FIG. 5C is obtained by converting a horizontal axis of the solid-line characteristic in FIG. 5B into the position in the Z direction.

As with the input device 100, the comparative input device 10 determines presence or absence of approach or contact of the fingertip FT to or with the operation surface on the basis of the detection data indicating the absolute self-capacitance of the first electrode 110 input from the detector 140 and determines presence or absence of pressing of the operation surface by the fingertip FT on the basis of the detection data indicating the mutual capacitance between the first electrode 110 and the second electrode 120 input from the detector 140.

When the comparative input device 10 determines presence or absence of approach or contact from a state where the fingertip FT is not performing any operation, therefore, the comparative input device 10 determines presence or absence of approach or contact on the basis of the broken-line characteristic in FIG. 5A. Since the capacitance changes along the characteristic in FIG. 5A from the left to the right when the fingertip FT approaches the operation surface, for example, the comparative input device 10 may determine approach of the fingertip FT when a capacitance count becomes an approach determination threshold TH1, and determine contact of the fingertip FT when the capacitance count becomes a contact determination threshold TH2. In an example, the approach determination threshold TH1 is 500, and the contact determination threshold TH2 is 1,300. Because capacitance varies depending on a finger, the contact determination threshold TH2 unavoidably needs to be set relatively low in order to certainly determine contact. The contact determination threshold TH2 in the example illustrated in FIG. 5A, therefore, is set to a value smaller than a count (about 4,100) obtained at the position of Z=0 mm, and contact is determined at Z=about 1 mm, which is immediately before the position of Z=0 mm at which the fingertip FT comes into contact with the operation surface.

After presence or absence of approach or contact is determined, presence or absence of pressing is determined on the basis of the solid-line characteristic illustrated in FIG. 5B. Because as the pressing force increases, the capacitance increases from a reference value, which is a mutual capacitance at a time when it is determined that the fingertip FT is in contact with the operation surface, the pressing force may be calculated in accordance with a difference between the measured capacitance and the reference value, or a pressing determination threshold (e.g., 1,000) may be provided and pressing may be determined.

As indicated by the solid-line characteristic in FIG. 5A (the mutual capacitance between the first electrode 110 and the second electrode 120), a mutual capacitance count is about −250 when an absolute self-capacitance count reaches the contact determination threshold TH2 (1,300) at the position of Z=about 1 mm and it is determined that the fingertip FT is in contact with the operation surface. The mutual capacitance count at the position of Z=0 mm, however, decreases to about −300. In addition, in the solid-line characteristic in FIG. 5B (the mutual capacitance between the first electrode 110 and the second electrode 120), the count when the pressing force is 0 N is about −300, and the pressing force is about 0.4 N when the mutual capacitance becomes the same value as the mutual capacitance count (about −250) at the position of Z=about 1 mm in FIG. 5A. In a range of pressing force of 0 N to about 0.4 N, therefore, the measured mutual capacitance count falls below the reference value, and a dead zone, where the pressing force cannot be calculated, is caused.

Since the dead zone exists, it is difficult for the comparative input device 10 to distinguish between pressing and approach in the determination of an operation state based on the capacitance count using the solid-line characteristics illustrated in FIGS. 5A and 5B if, for example, the fingertip FT repeats pressing and approach while the pressing force of the fingertip FT decreases after pressing.

In other words, this means that, as illustrated in FIG. 5C, it is difficult for the comparative input device 10 to distinguish between pressing and approach in a determination of the operation state based on the capacitance using the characteristic illustrated in FIG. 5C if, for example, the fingertip FT repeats pressing and approach while the pressing force of the fingertip FT decreases after pressing. This is because the capacitance drops around Z=0 mm as indicated in the characteristic in FIG. 5C by a broken-line circle around Z=0 mm, and this section behaves like a dead zone. This drop in capacitance around Z=0 mm is caused by movement of the electric field to the fingertip FT. That is, if the electric field moves to a space between the second electrode 120 and a finger, a detected capacitance (mutual capacitance) becomes, around Z=0 mm, lower than without a finger, and then begins to increase as a result of pressing. Pressing, therefore, cannot be determined as described above, and a dead zone is caused.

The input device 100 according to the embodiment solves the above-described problems, and the operation state can be easily and accurately determined especially around Z=0 mm when the operation state is determined using the mutual capacitance between the first electrode 110 and the second electrode 120.

<Result of Simulation of Input Device 100 According to Embodiment>

Figure 6A:
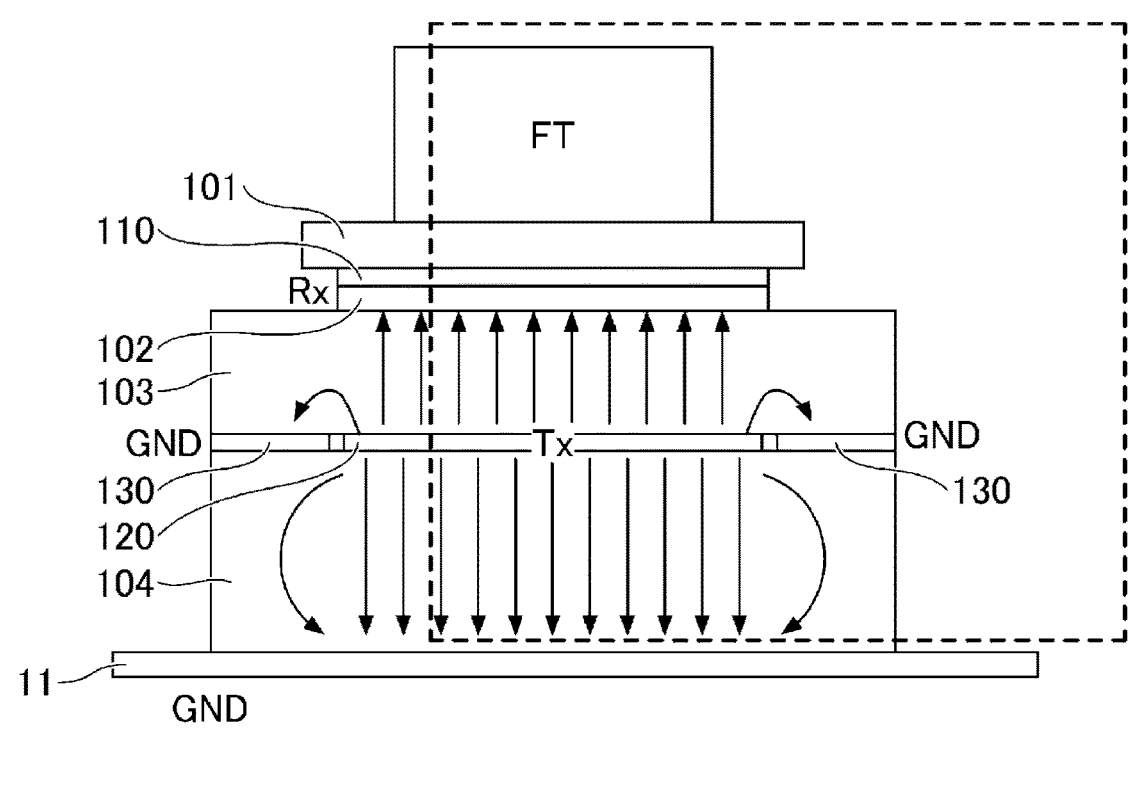
FIG. 6A is a diagram illustrating a cross-sectional configuration of a simulation model of the input device 100 according to the embodiment.
Figure 6A:
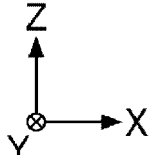
Figure 6B:
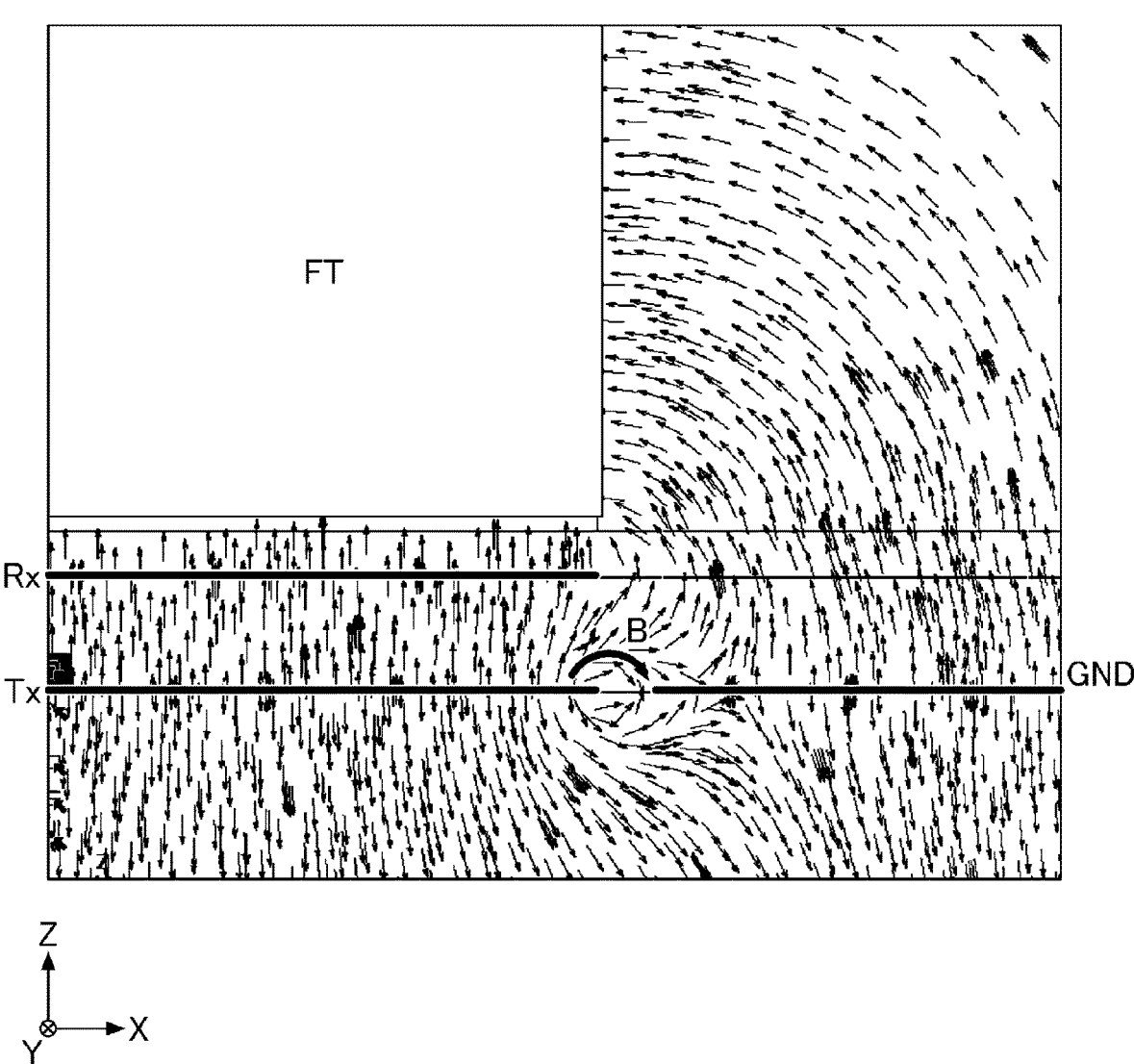
FIG. 6B is a diagram illustrating a result of simulation of electric field distribution of the input device 100.
Figure 6C:
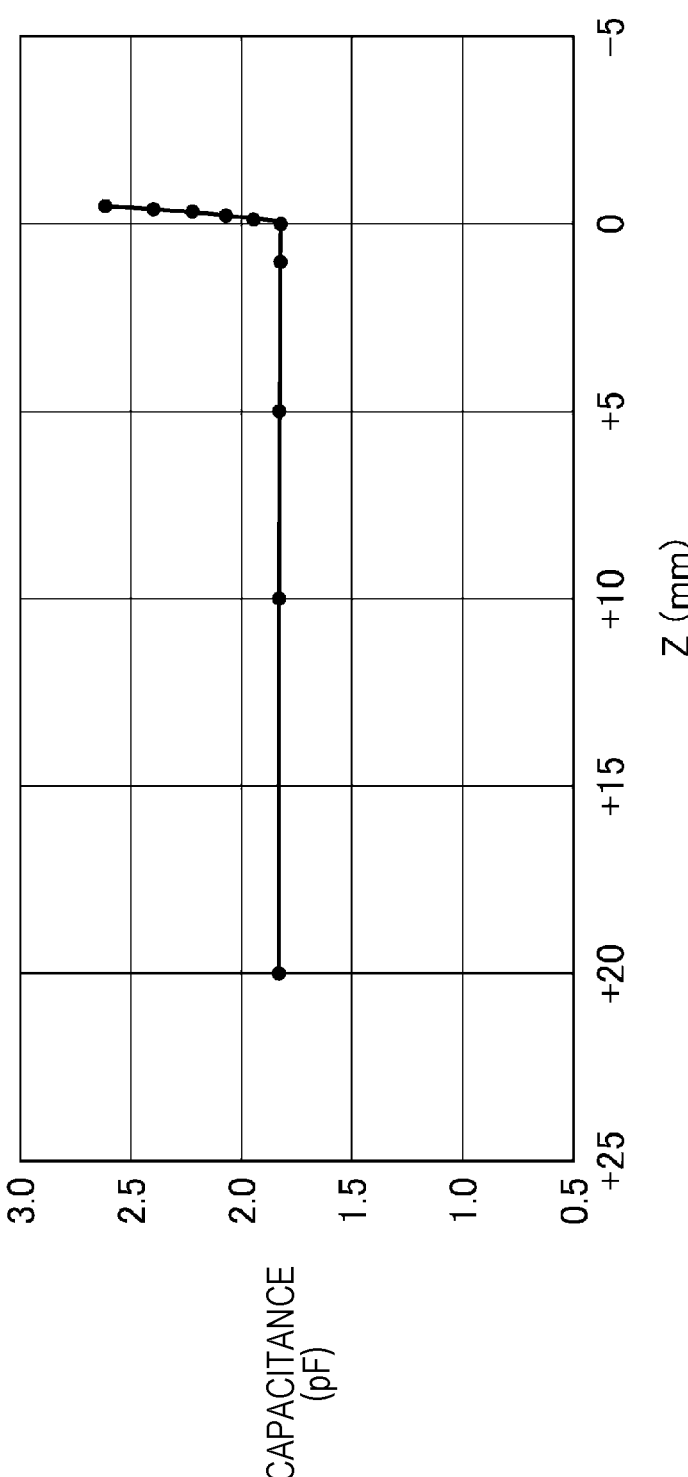
FIG. 6C is a diagram illustrating a characteristic of capacitance of the input device 100.

FIG. 6A is a diagram illustrating a cross-sectional configuration of a simulation model of the input device 100 according to the embodiment. FIG. 6B is a diagram illustrating a result of simulation of electric field distribution of the input device 100. FIG. 6C is a diagram illustrating a characteristic of capacitance of the input device 100. FIG. 6C illustrates a characteristic corresponding to that of the comparative input device 10 in FIG. 5C.

FIG. 6B illustrates electric field distribution in a state where an alternating current voltage is applied to the second electrode 120 and the first electrode 110 and the third electrode 130 are maintained at the ground potential in order to obtain the detection data indicating the mutual capacitance between the first electrode 110 and the second electrode 120. FIG. 6B illustrates electric field distribution in a part defined in FIG. 6A by a broken-line rectangle.

As illustrated in FIG. 6B, because an electric field from the second electrode 120 (Tx) toward the third electrode 130 (GND) is caused as indicated by an arrow B, the electric field is weaker than in FIG. 4B from the second electrode 120 (Tx) toward the fingertip FT.

As illustrated in FIG. 6C, in the result of the simulation of changes in capacitance (the mutual capacitance between the first electrode 110 and the second electrode 120) in relation to the position of the fingertip FT in the Z direction, a drop (dead zone) in capacitance around Z=0 mm is eliminated, and a substantially constant value is obtained in a direction in which the fingertip FT goes away from Z=0 mm. While a Z coordinate is positive, the capacitance count is substantially constant until Z=0 mm, and the capacitance sharply increases from Z=0 mm in this characteristic.

A reason why the characteristic improves around Z=0 is that since the third electrode 130 is provided in such a way as to surround the second electrode 120 and the third electrode 130 is maintained at the ground potential when the mutual capacitance is detected, an electric field component moving from the second electrode 120 to the third electrode 130 is caused as illustrated in FIG. 6B, and an electric field component moving from the second electrode 120 to the fingertip FT is reduced.

In general, an electric field becomes most strong at an edge of an electrode. In order to effectively cause an electric field component moving from the second electrode 120 to the third electrode 130, the following may be performed. As illustrated in FIGS. 1 and 2, a position of an edge of the first electrode 110 and a position of an edge of the second electrode 120 are extremely close to each other in plan view. In order to effectively cause an electric field component moving from the second electrode 120 to the third electrode 130, therefore, the positions of the edges of the first electrode 110 and the second electrode 120 and a position of an inner edge of a rectangular ring of the third electrode 130 are made close to each other in plan view.

Effects

As described above, the input device 100 includes the first electrode 110, the second electrode 120 provided with the elastic dielectric 103 sandwiched between the second electrode 120 and the first electrode 110, the third electrode 130 provided adjacent to the second electrode 120, and the detector 140 that detects approach and contact of the fingertip FT to and with the operation surface located on the front side of the first electrode 110 and pressing of the operation surface by the fingertip FT on the basis of an output of the first electrode 110. With a simple configuration including the first electrode 110, the second electrode 120, and the third electrode 130, therefore, approach and contact of the fingertip FT and pressing by the fingertip FT can be detected on the basis of the output of the first electrode 110.

The input device 100 with a simple configuration capable of detecting approach and contact of the fingertip FT and pressing by the fingertip FT, therefore, can be provided.

In addition, since the third electrode 130 is maintained at a certain potential when the detector 140 detects pressing by the fingertip FT, movement of the electric field from the second electrode 120 to the fingertip FT can be reduced by deflecting, to the third electrode 130, the movement of the electric field from the second electrode 120 to the fingertip FT. As a result, as illustrated in FIG. 6C, a drop in the capacitance count around Z=0 mm can be eliminated in the characteristic of changes in capacitance (the mutual capacitance between the first electrode 110 and the second electrode 120) in relation to the position of the fingertip FT in the Z direction. The input device 100 capable of accurately determining the operation state around Z=0 mm, therefore, can be provided.

In addition, the detector 140 detects approach or contact of the fingertip FT on the basis of the absolute self-capacitance of the first electrode 110 and detects pressing by the fingertip FT on the basis of the mutual capacitance between the first electrode 110 and the second electrode 120. The input device 100 with a simple configuration capable of detecting approach or contact of the fingertip FT to or with the operation surface and pressing of the operation surface using the output of the first electrode 110, therefore, can be provided.

In addition, when the detector 140 detects approach or contact of the fingertip FT, alternating current voltages having the same frequency and the same phase are applied to the first electrode 110, the second electrode 120, and the third electrode 130. As a result, the second electrode 120 and the third electrode 130 can function as active shields and block floating capacitance from an external ground. Since there is no potential difference between the first electrode 110 and both the second electrode 120 and the third electrode 130, the first electrode 110 is hardly affected by capacitance of a ground, and the detection sensitivity of the absolute self-capacitance of the first electrode 110 can be improved. An approach state can also be detected.

In addition, the first electrode 110 and the third electrode 130 are maintained at a certain potential when the detector 140 detects pressing by the fingertip FT, and a certain alternating current voltage is applied to the second electrode 120 when the detector 140 detects pressing by the fingertip FT. As a result, a potential difference can be caused between the first electrode 110 and the second electrode 120, and the mutual capacitance between the first electrode 110 and the second electrode 120 can be measured. How deeply the operation surface is pressed can then be detected on the basis of the mutual capacitance.

In addition, since the third electrode 130 is provided in such a way as to surround the second electrode 120, the second electrode 120 and the third electrode 130 can function as active shields, a greater blocking effect can be produced when floating capacitance from a ground is blocked, and the detection sensitivity of the absolute self-capacitance of the first electrode 110 can be improved.

In addition, since the first electrode 110 and the second electrode 120 have similar electrode shapes and central positions thereof match in plan view, the input device 100 symmetrically arranged in plan view, having few imbalances in any direction in plan view, and capable of accurately determining the operation state can be provided.

First Modification

Figure 7:
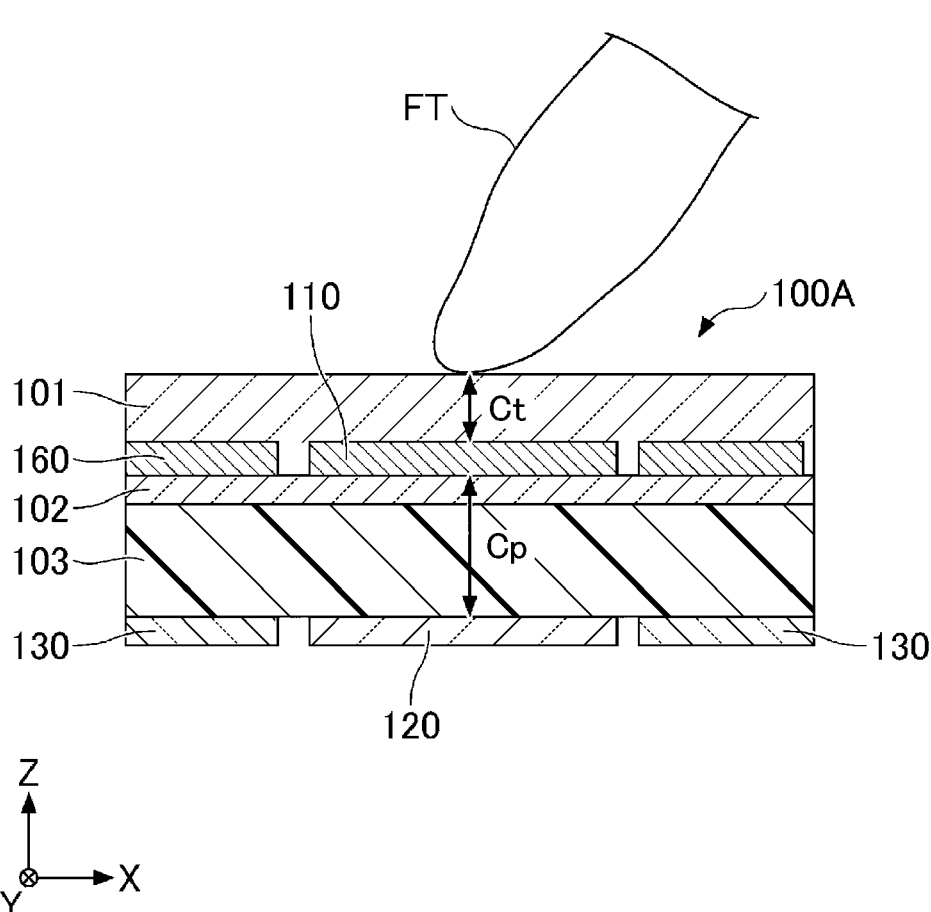
FIG. 7 is a diagram illustrating a cross-sectional structure of an input device 100A according to a first modification of the embodiment.

FIG. 7 is a diagram illustrating a cross-sectional structure of an input device 100A according to a first modification of the embodiment. In FIG. 7, the detector 140 and the MCU 150 are omitted. The input device 100A has a configuration where a shield electrode 160 provided in such a way as to surround the first electrode 110 in plan view is added to the input device 100 illustrated in FIG. 2 between the top panel 101 and the elastic dielectric 103. The shield electrode 160 may have, for example, a rectangular ring shape like the third electrode 130, or may be four electrodes provided along four sides of the first electrode 110.

The same voltage as for the third electrode 130 may be applied to the shield electrode 160. That is, when the detection data indicating the absolute self-capacitance of the first electrode 110 is obtained, the same alternating current voltage as those applied to the first electrode 110, the second electrode 120, and the third electrode 130 may be applied to the shield electrode 160. When the detection data indicating the mutual capacitance between the first electrode 110 and the second electrode 120 is obtained, the shield electrode 160 and the third electrode 130 may be maintained at the same certain potential. In doing so, when the detection data indicating the absolute self-capacitance of the first electrode 110 is obtained, floating capacitance from an external ground can be blocked more effectively, and the detection sensitivity of the first electrode 110 can be further increased.

Second Modification

Figure 8:
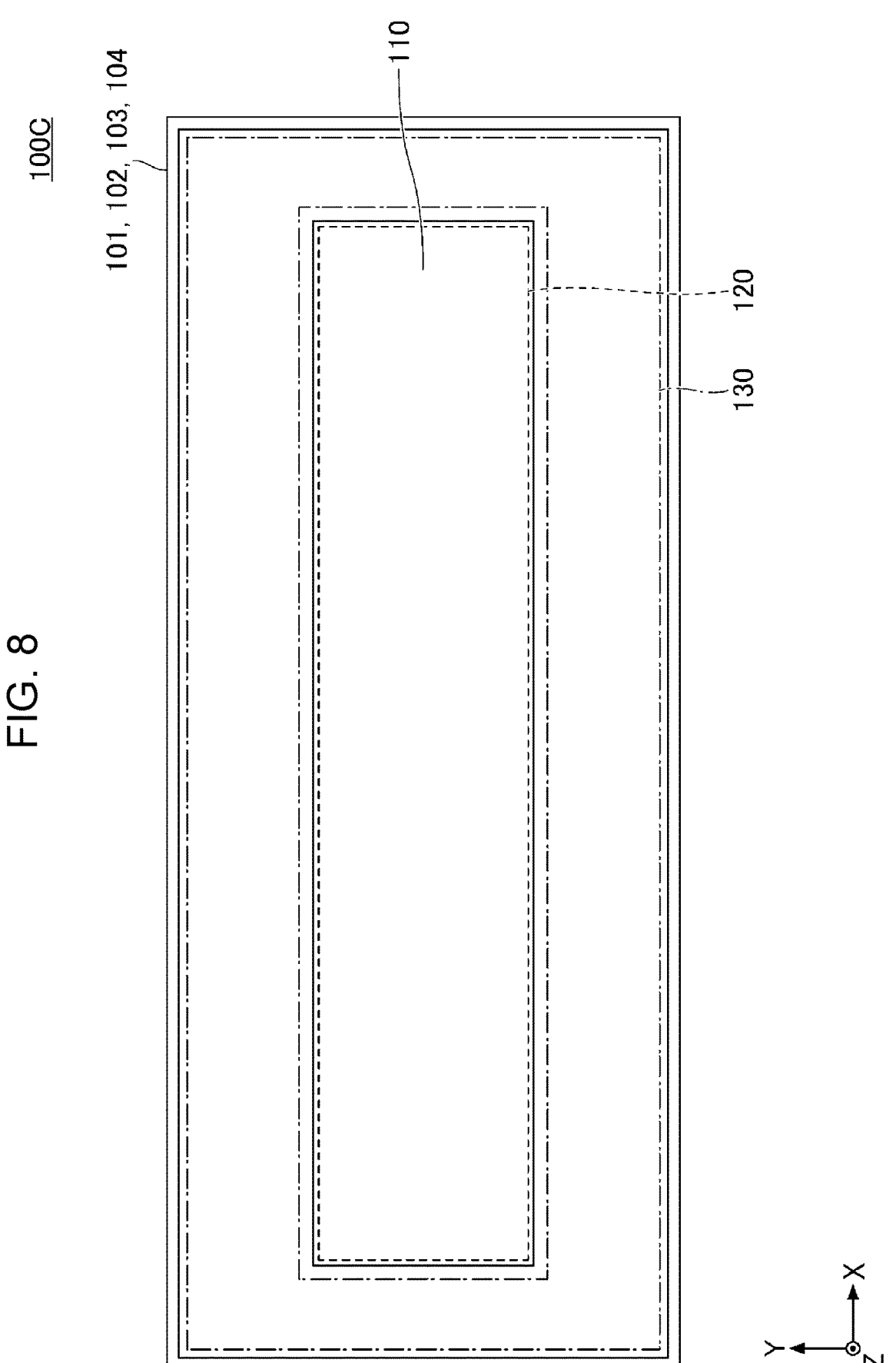
FIG. 8 is a plan view illustrating an input device 100C according to a second modification of the embodiment.

FIG. 8 is a plan view illustrating an input device 100C according to a second modification of the embodiment. The input device 100C has a configuration where the input device 100 illustrated in FIG. 1 is extended in the X direction. The top panel 101, the elastic dielectric 103, the substrate 104, the first electrode 110 for which a resistive electrode material is used, the second electrode 120, and the third electrode 130, therefore, are extended in the X direction.

The input device 100C can be used as a slider. When a position of the fingertip FT in the X direction changes, a resistance viewed from a connection end of the first electrode 110 changes, and accordingly the amount of charge detected by the detector 140 changes. By disposing the detector 140 at both ends of the first electrode 110 and obtaining a ratio of the amount of charge, therefore, the position of the fingertip FT in the X direction can be detected.

Third Modification

Figure 9:
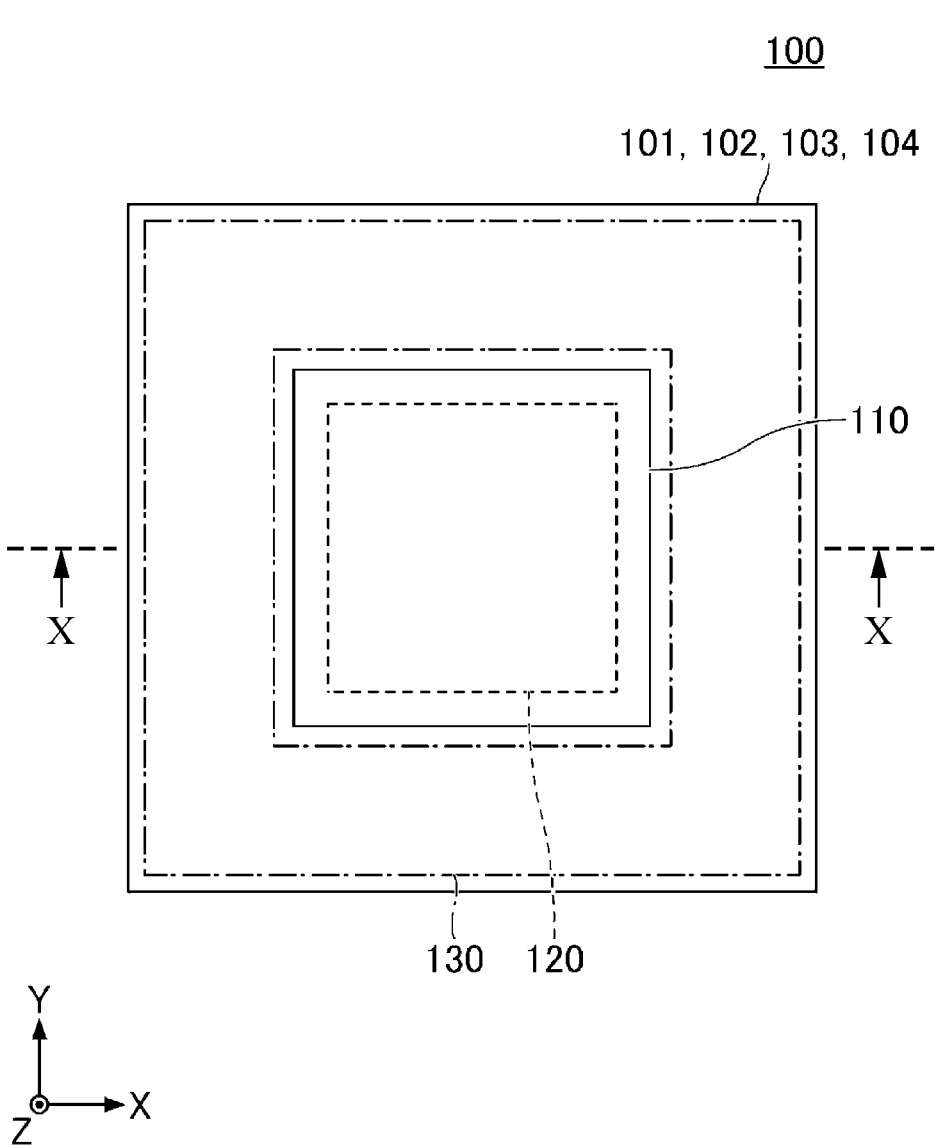
FIG. 9 is a diagram illustrating planar configuration of an input device 100D according to a third modification of the embodiment.
Figure 10:
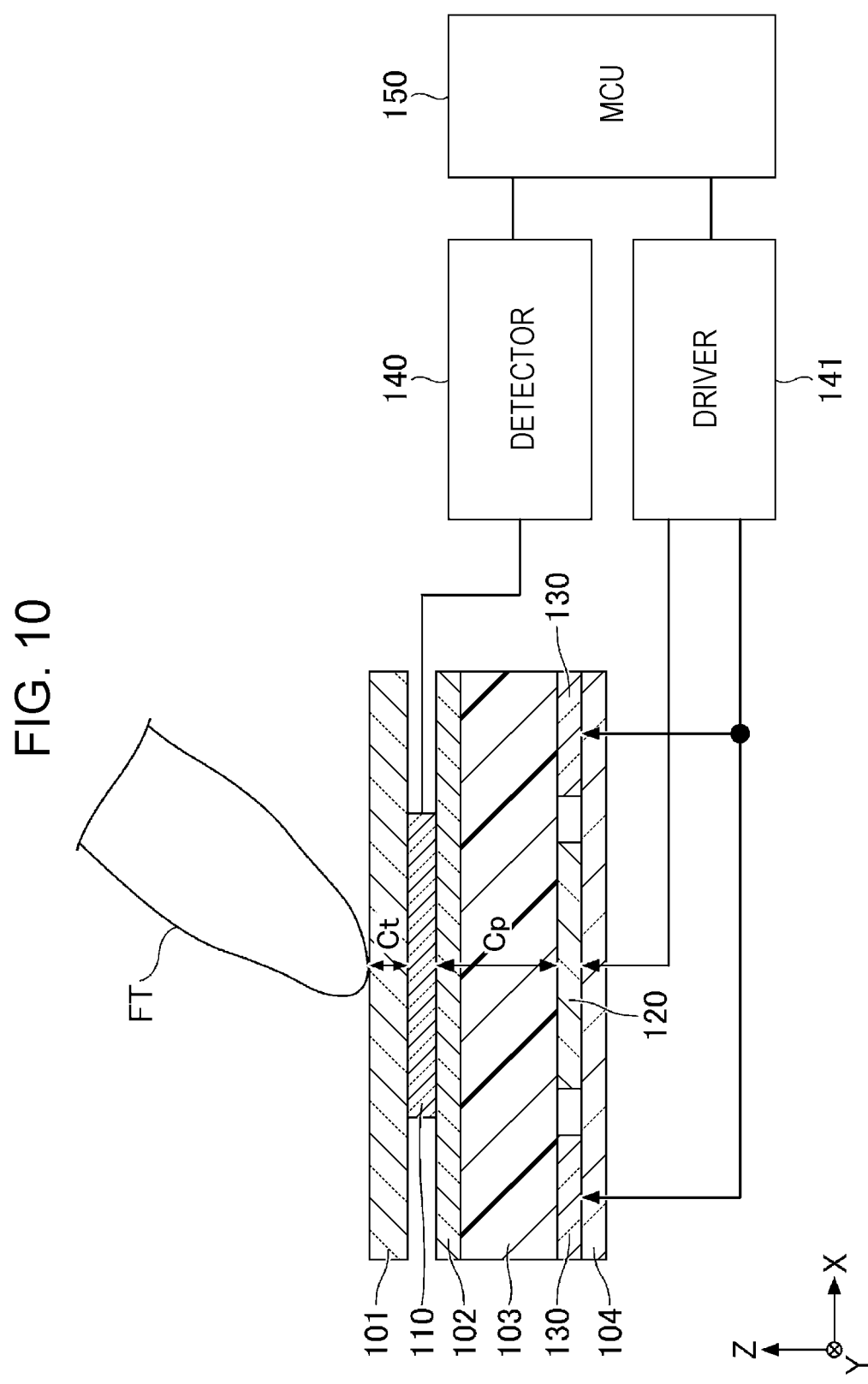
FIG. 10 is a diagram illustrating a cross-section taken along an arrow X-X in FIG. 9.

FIG. 9 is a diagram illustrating planar configuration of an input device 100D according to a third modification of the embodiment. FIG. 10 is a diagram illustrating a cross-section taken along an arrow X-X in FIG. 9.

The input device 100D according to the third modification is obtained by making the area of the first electrode 110 of the input device 100 illustrated in FIGS. 1 and 2 greater than that of the second electrode 120.

The first electrode 110 is rectangular in plan view in an example, and is square here. The area of the first electrode 110 is greater than that of the second electrode 120, and the first electrode 110 is provided such that the entirety of the outer edge of the first electrode 110 is located outside that of the second electrode 120 in plan view. The outer edge of the second electrode 120, therefore, is included in the outer edge of the first electrode 110 in plan view.

The area of the first electrode 110 is greater than that of the second electrode 120, and the entirety of the outer edge of the first electrode 110 is located outside that of the second electrode 120 in plan view. For example, the first electrode 110 and the second electrode 120 may have similar electrode shapes, and central positions thereof may match in plan view.

In the present modification, when the mutual capacitance between the first electrode 110 and the second electrode 120 is detected, not only movement of an electric field from the second electrode 120 to a finger can be reduced by maintaining the third electrode 130 at a certain potential, but also the area of the first electrode 110, which is closer to the finger, is increased to completely cover the second electrode 120 and further reduce the movement of the electric field to the space between the second electrode 120 and the finger. Since, therefore, there is no decrease in the capacitance between the first electrode 110 and the second electrode 120 and no dead zone is caused, the detector 140 can certainly detect pressing. As a result, when the area of the first electrode 110 is greater than that of the second electrode 120, the movement of the electric field to the finger can be suppressed more effectively than when the first electrode 110 and the second electrode 120 have the same area.

The input device 100 with a simple configuration capable of detecting approach and contact of the fingertip FT and pressing by the fingertip FT more accurately, therefore, can be provided.

Although an input device according to an exemplary embodiment of the present disclosure has been described above, the present disclosure is not limited to the specifically disclosed embodiment, and may be modified or altered in various ways without deviating from the scope of the claims.

What is claimed is:

1. An input device comprising:
an operation surface configured to be operated by a detection target;
a first electrode disposed on a back side of the operation surface;
an elastic dielectric provided on a back side of the first electrode opposite to the operation surface;
a second electrode provided on a back side of the elastic dielectric opposite to the first electrode;
a third electrode provided adjacently to the second electrode; and
a detector configured to detect approach of the detection target, contact of the detection target with the operation surface, and pressing of the operation surface by the detection target based on an output from the first electrode, and to apply a voltage to the first electrode; and
a driver configured to apply driving voltages to the third electrode and the second electrode,
wherein the detector is configured to detect the approach or contact of the detection target based on an absolute self-capacitance of the first electrode, and to detect the pressing by the detection target based on a mutual capacitance between the first electrode and the second electrode,
and wherein when the detector detects the approach or contact of the detection target, the detector and the driver apply alternating current voltages having a same frequency and a same phase to the first electrode, and the second electrode and the third electrode, respectively.

2. The input device according to claim 1,
wherein, when the detector detects the pressing by the detection target, the driver maintains the third electrode at a certain potential.

3. The input device according to claim 1,
wherein the third electrode is disposed to surround the second electrode in plan view from a direction normal to the operation surface.

4. The input device according to claim 1,
wherein area of the first electrode is greater than area of the second electrode, and
wherein an entire outer periphery of the first electrode is located outside an outer periphery of the second electrode in plan view from a direction normal to the operation surface.

5. The input device according to claim 4,
wherein shapes of the first electrode and the second electrode are similar figures having a center at a same position in the plan view.

6. The input device according to claim 1, wherein the third electrode is provided on the back side of the elastic dielectric.

7. A input device comprising:
an operation surface configured to be operated by a detection target;
a first electrode disposed on a back side of the operation surface;
an elastic dielectric provided on a back side of the first electrode opposite to the operation surface;
a second electrode provided on a back side of the elastic dielectric opposite to the first electrode;
a third electrode provided adjacently to the second electrode; and
a detector configured to detect approach of the detection target, contact of the detection target with the operation surface, and pressing of the operation surface by the detection target based on an output from the first electrode, and to apply a voltage to the first electrode; and
a driver configured to apply driving voltages to the third electrode and the second electrode,
wherein the detector is configured to detect the approach or contact of the detection target based on an absolute self-capacitance of the first electrode, and to detect the pressing by the detection target based on a mutual capacitance between the first electrode and the second electrode
and wherein when the detector detects the pressing by the detection target, the detector maintains the first electrode at a certain potential, and the driver maintains the third electrode at a certain potential while applying a certain alternating current voltage to the second electrode.

8. The input device according to claim 7,
wherein, when the detector detects the pressing by the detection target, the driver maintains the third electrode at a certain potential.

9. The input device according to claim 7,
wherein the third electrode is disposed to surround the second electrode in plan view from a direction normal to the operation surface.

10. The input device according to claim 7,
wherein area of the first electrode is greater than area of the second electrode, and wherein an entire outer periphery of the first electrode is located outside an outer periphery of the second electrode in plan view from a direction normal to the operation surface.

11. The input device according to claim 10, wherein shapes of the first electrode and the second electrode are similar figures having a center at a same position in the plan view.

12. The input device according to claim 7, wherein the third electrode is provided on the back side of the elastic dielectric.

\* \* \* \* \*